(12) United States Patent
Wuestefeld

(10) Patent No.: US 7,622,728 B2
(45) Date of Patent: Nov. 24, 2009

(54) DEVICE FOR OPTOELECTRONIC MONITORING OF OBJECTS AND DETECTING OF LIGHT BEAMS SCATTERED AT A FACEPLATE

(75) Inventor: Martin Wuestefeld, Sexau (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 11/656,498

(22) Filed: Jan. 23, 2007

(65) Prior Publication Data

US 2007/0215822 A1    Sep. 20, 2007

(30) Foreign Application Priority Data

Jan. 27, 2006    (DE) .................. 10 2006 004 193

(51) Int. Cl.
*G01N 21/86*    (2006.01)
*G01V 8/00*    (2006.01)

(52) U.S. Cl. ............... 250/559.4; 250/221; 356/237.3; 356/239.8

(58) Field of Classification Search ............ 250/221, 250/222.1, 224, 559.4; 356/237.2, 237.3, 356/239.7, 239.8; 340/555–557
See application file for complete search history.

(56) References Cited

U.S. PATENT DOCUMENTS 6,301,003 B1 * 10/2001 Shirai et al. ............. 356/4.01
6,683,969 B1 * 1/2004 Nishigaki et al. ........... 382/104
2005/0200840 A1    9/2005 Terui
2007/0139775 A1 * 6/2007 Reich et al. ............... 359/515

FOREIGN PATENT DOCUMENTS

| | | |
|---|---|---|
| DE | 93 21 155 U1 | 8/1996 |
| DE | 36 19 208 A1 | 12/1997 |
| DE | 196 52 440 A1 | 6/1998 |
| DE | 43 45 446 C2 | 7/1998 |
| DE | 197 04 793 A1 | 8/1998 |
| DE | 197 57 847 A1 | 7/1999 |
| DE | 43 45 466 C2 | 9/1999 |
| DE | 299 11 390 U1 | 9/1999 |
| DE | 199 08 214 A1 | 9/2000 |
| EP | 1 418 089 A2 | 5/2004 |

* cited by examiner

*Primary Examiner*—Thanh X Luu
*Assistant Examiner*—Francis M Legasse, Jr.
(74) *Attorney, Agent, or Firm*—The Nath Law Group; Jerald L. Meyer; Sung Yeop Chung

(57) ABSTRACT

A device for optoelectronic monitoring of an object (26) contains a transmitting unit (12) and a receiving unit (14) that are located in a housing (10) covered by a faceplate (16). The transmitting unit (12) emits light beams (24) in a structured illuminating pattern. The illuminating pattern of the illuminated object (26) is recorded on an image recorder (28) by the receiving unit (14). Soiling (38) on the faceplate (16) is indicated by recording the light beams (24) diffusely scattered at the faceplate (16) on the image recorder (28).

8 Claims, 6 Drawing Sheets

Figure 1:
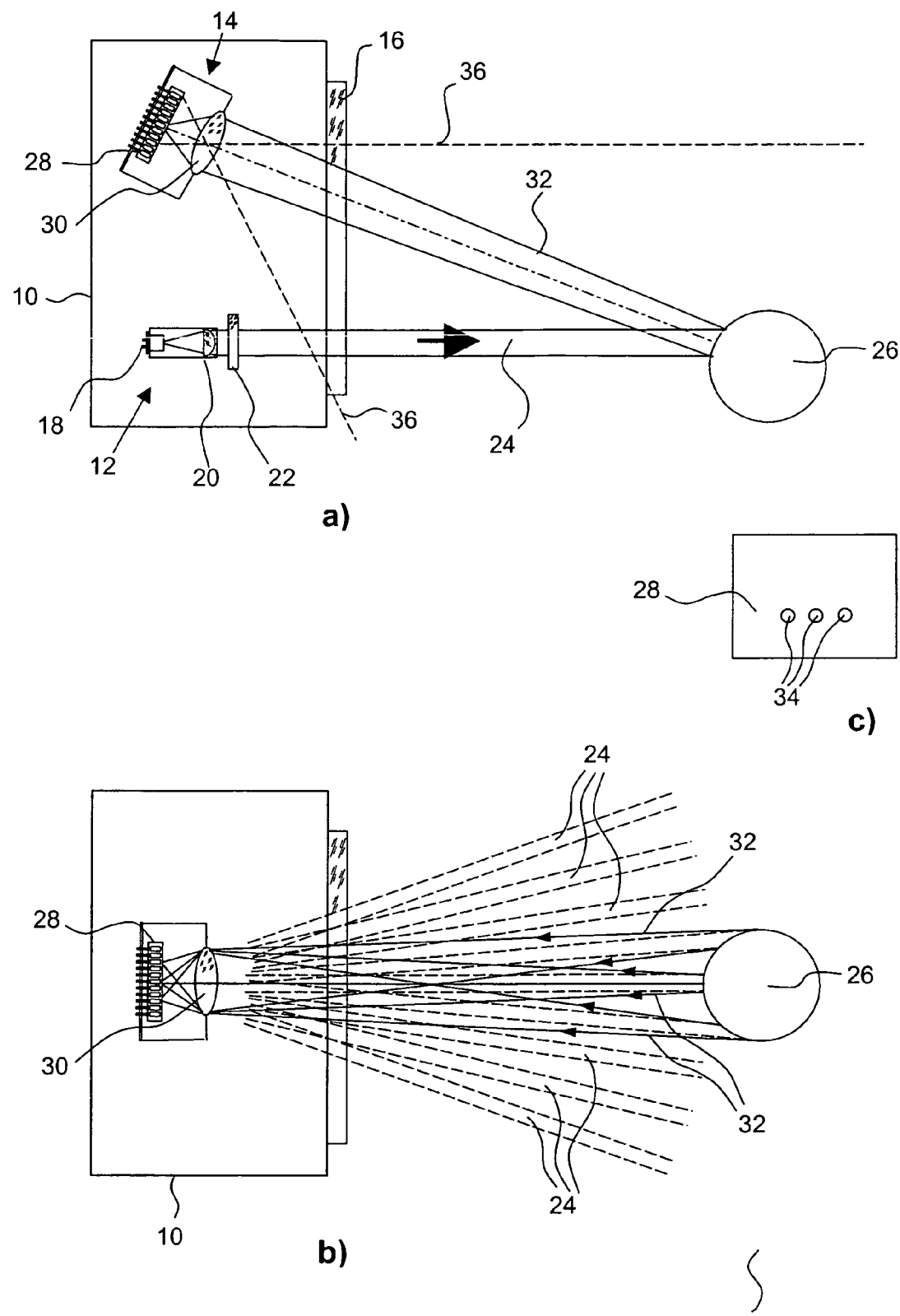

DEVICE FOR OPTOELECTRONIC MONITORING OF OBJECTS AND DETECTING OF LIGHT BEAMS SCATTERED AT A FACEPLATE

This invention relates to a device for optoelectronic monitoring of objects in accordance with the principal concept of claim 1.

Optoelectronic monitoring is used in many fields, particularly for security and a control purposes. For example, internal spaces can be monitored for the presence of persons or articles, e.g. for securing entrance areas, for ensuring the safety of dangerous machines. Similarly, objects can be checked, in order to monitor the removal or displacement of these objects.

Devices for optoelectronic monitoring which operate according to the scanner principle (e.g. DE 43 45 446 C2) are known. With these devices, a collimated light beam passes over the field which is to be monitored and the diffuse light scattered by the object to be monitored is monitored by a receiving unit. These devices use rotating optical systems that are complex to produce and calibrate. Moreover, the life span of such mechanically rotating systems is limited.

Other optoelectronic monitoring devices are known that are in accordance with the generic concept (e.g. DE 299 11 390 U1), wherein a transmitting unit emits light beams in a structured light pattern and the object illuminated with this light pattern is recorded and monitored in a an image recorder of a receiving unit.

The known devices can be used both for monitoring objects and for monitoring interior spaces. In the monitoring of objects, the presence of the object is monitored, while, in monitoring an interior space, the presence of an object in the monitored space is detected. The expression "monitoring of objects" shall include both possible applications.

A compact design and simple installation of the device is attained if the transmitting unit and the receiving unit are located in a shared housing. The housing is covered by a faceplate through which the light beams exit and through which the receiving unit receives the light coming from the object. If the faceplate is soiled the emitted light beams and the received light coming from the illuminated object are weakened, which can disrupt the function of the device. Likewise, manipulation of the monitoring operation is possible in that the faceplate is more or less strongly masked.

In the device in accordance with DE 43 45 446 C2, soiling on the faceplate is monitored in that a light beam from an additional light source is transmitted through a zone of the faceplate and the intensity of the light beam that passes through the faceplate is measured by an additional receiving unit. The monitoring of soiling requires an additional optical system consisting of a transmitting unit and a receiving unit. In addition, the monitoring of soiling does not take place over the entire area of the faceplate that is used for the light employed for object monitoring.

It is therefore the object of this invention to make available a device for optoelectronic monitoring of objects that enables continuous functional control by means of a simple and robust design.

This object is attained according to this invention by means of a device with the features of claim 1.

Advantageous designs and further embodiments of this invention are disclosed in the secondary claims.

The device of this invention uses the principle of structured illumination. A transmitting unit emits light beams in a structured illumination pattern and illuminates the object to be monitored with this structured lighting pattern. The structured illuminating pattern can be made to be one-dimensional or two-dimensional, it can comprise discrete illuminated points or a continuously illuminated pattern; in the simplest case, it can be illumination along a line. The object is observed by a receiving unit that receives the illuminating pattern of the object and records it on an image recorder. The receiving unit can in particular be a digital camera. The image pattern recorded by the image recorder is evaluated according to geometric characteristics. E.g. using triangulation it can be unequivocally determined from the image pattern whether the monitored object is present in the monitored space, whether it has moved or has been removed, or whether an unwanted object has traveled into the monitored space.

The transmitting unit, the receiving unit and the faceplate are disposed in the shared housing in a manner so that light beams emitted by the transmitting unit, which are reflected directly, do not travel into the receiving unit. If however light beams from the transmitting unit are diffusely scattered at the faceplate, then the receiving unit sees the scattered light at the faceplate separately from the light coming from the object. It can therefore be determined in the receiving unit evaluation whether diffuse scattering of the light beams emitted by the transmitting unit occurs at the faceplate. The occurrence of diffuse scattering at the faceplate is an indication of soiling deposited on the faceplate. Diffuse scattering at the faceplate can also be caused by the fact that the faceplate is masked for purposes of manipulation. The expression "diffuse scattering at the faceplate" shall include both cases, i.e. scattering by soiling directly deposited on the faceplate and also scattering at a mask placed in front of the faceplate.

Since the zone in which the light beams emitted by the transmitting unit strike the faceplate at a different viewing angle for the receiving unit than those from the space to be monitored, the light beams scattered at the faceplate can preferably be imaged on a image recorder of the receiving unit that is separated from the image of the space to be monitored.

In a preferred embodiment, which is characterized by a particularly simple design, the light beams are single beams that are fanned out over a scanned plane. The object is thereby illuminated by points arranged in a line in the scanned plane. Accordingly, the recording of the object on the image recorder is detected as a series of image points arranged in a line. The receiving unit is offset with respect to this scanned plane so that the receiving unit receives the light coming from the object at a viewing angle that is inclined with respect to the scanned plane. The light possibly arriving at the faceplate from diffuse scattering, on the other hand, is received at a different viewing angle and is recorded on the image recorder as a series of image points that is offset with respect to the series of image points for the object. This leads to simple and reliable signals processing for purposes of evaluating the image recorder. In one particularly simple embodiment, the transmitting unit can contain a light source with beam collimation and a diffractive optical element. The light source can be a point light source, e.g. a laser diode with downstream collimating lens. The diffractive optical element splits the collimated light beam from the light source into a fan of individual beams.

The receiving unit in particular contains receiving optics that record the image of the object onto the image recorder. The image recorder is preferably configured as a digital camera with photoelectric elements arranged in a matrix, e.g. photodiodes, CCDs or CIDs.

In the device of this invention, the light beams emitted by the transmitting unit for purposes of monitoring the object and the receiving unit used for monitoring the object are simultaneously used for monitoring soiling on or manipulation of the faceplate. This monitoring of soiling or manipulation thus does not lead to any additional production costs for the device. The monitoring of soiling or manipulation is particularly reliable, since exactly the same zone of the faceplate is monitored through which the light for object monitoring passes.

In one further embodiment of this invention, the functioning of the device can also be checked and controlled in a simple manner and without additional complexity. For this purpose, a partial beam from the transmitting unit is diverted so that it is not used for scanning the object which is to be monitored, but rather strikes a location of the faceplate lying outside the scanned area. This location is made to scatter diffusely, for which purpose e.g. a diffuse scattering element is applied to the faceplate or the otherwise transparent faceplate is matted. The partial beam striking this location is always diffusely scattered and is accordingly recorded at a certain control image point of the receiver, preferably on the image recorder. As long as this control image point is present on the image recorder at the prescribed location and with the prescribed intensity, this indicates that the transmitting unit and the receiving unit function properly and also that the faceplate is installed in the prescribed position.

If a further improvement in fault security of the device is desired, it is also possible to control whether all pixels of the image recorder operate properly. For this purpose, in a further embodiment of this invention, the entire image recorder is illuminated by means of a wide angle light source, e.g. a light emitting diode. With this complete illumination of the image recorder, it can be determined whether every pixel or every group of pixels supplies an appropriate signal. This examination using a full illumination of the image recorder cannot run continuously while the device is operating, however, since object monitoring is not able to function with such complete illumination.

It is not necessary for purposes of monitoring the device's functionality for the image recorder of the receiving unit also to be used for monitoring for soiling. It is also possible to use an additional receiving element in the receiving unit, which element is separated from the image recorder, e.g. a photodiode, for this purpose. Different variants are possible. The additional receiving element can, in the manner described above, receive the light of the light beams that is diffusely scattered at the faceplate due to soiling or manipulation. If a wide angle light source is used, it is then also possible to use the diffuse scattered light of this wide angle light source for monitoring the occurrence of soiling. This can have the advantage that it is not necessary to use a light beam of the structured illuminating pattern, so that the entire illuminating pattern can therefore be used for object monitoring. Depending on the number and the angular distance of the light beams and the dimensions of the housing, in some circumstances no sufficient separation of the light beams occurs at the faceplate to allow one of these light beams to be used separately for functional control.

If the receiving unit has a separate receiving element that is apart from the image recorder, it is then also possible to monitor the direct reflection of the light from the transmitting unit at the faceplate with this receiving element. In the case of unimpaired functionality, the direct reflection of the beams from the transmitting unit has a constant light intensity. On soiling or manipulation of the faceplate diffusely scattered light adds to the intensity of the directly reflected light so that the light intensity increases. On the other hand, in case of an operating fault of the transmitting unit the intensity of the directly reflected light decreases. It is thus possible to monitor for soiling and manipulation and also to check on the functioning of the transmitting unit by receiving and processing the direct reflection.

Figure 2:
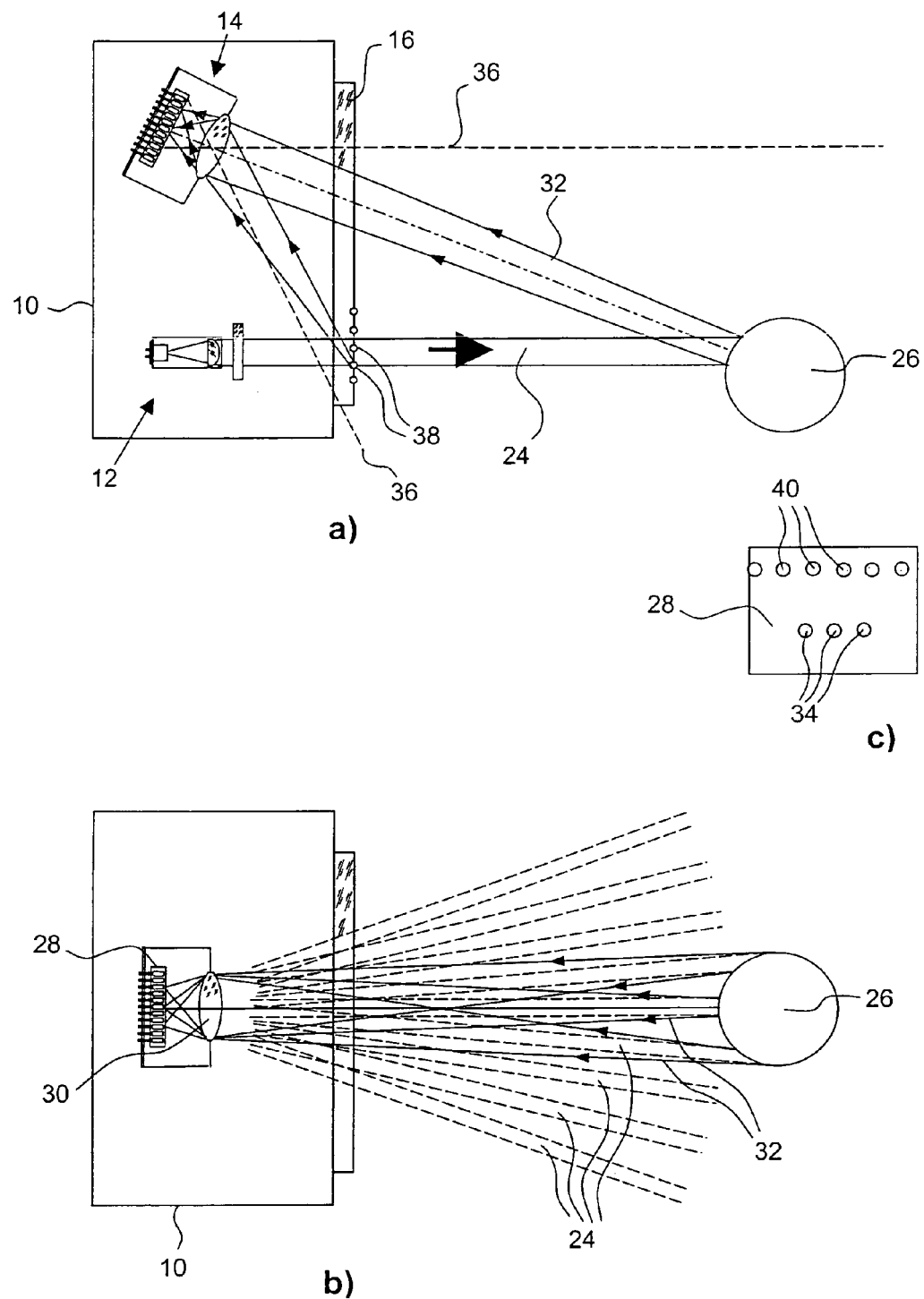
Figure 3:
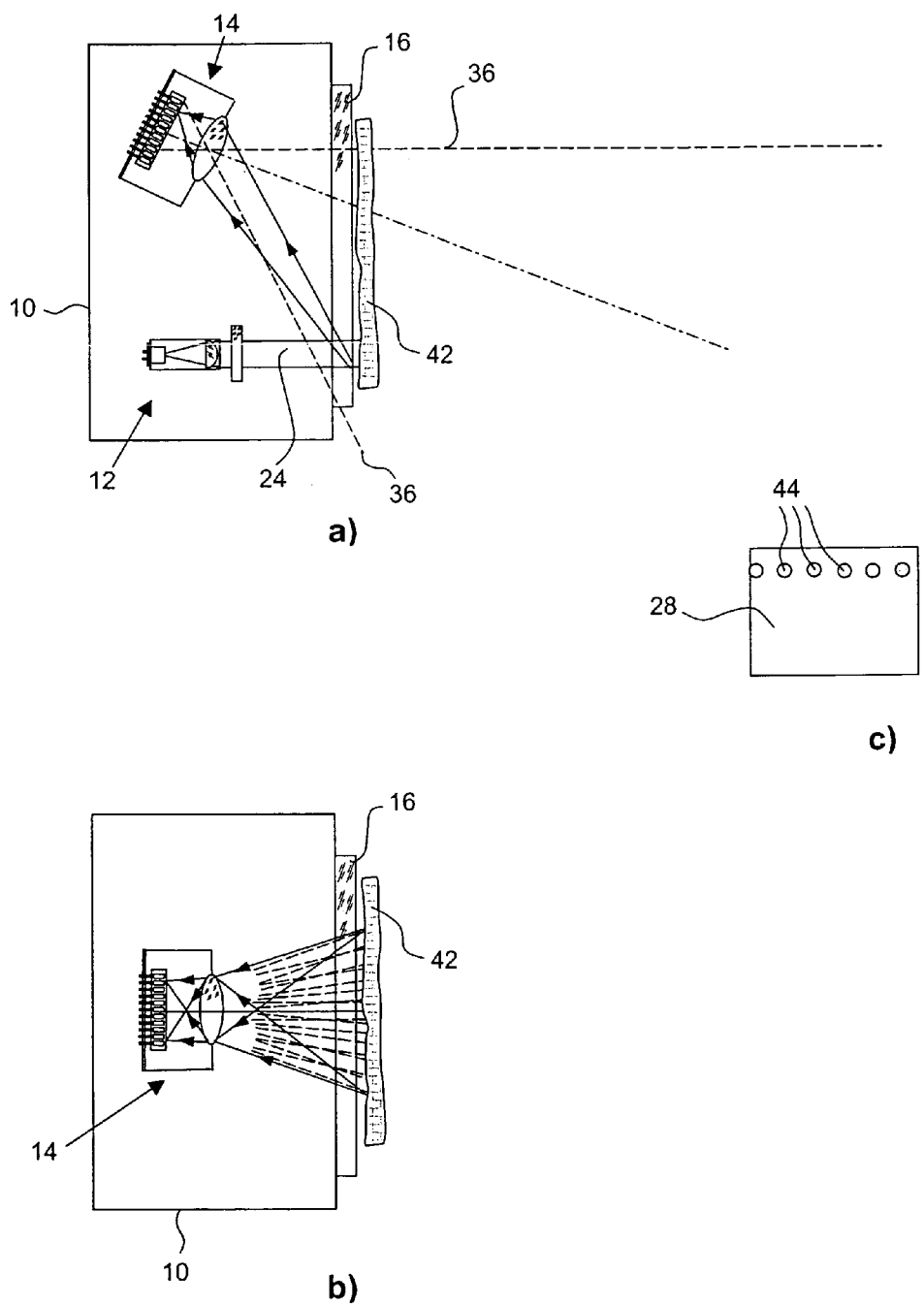

In the following, the invention is described in greater detail based on the exemplary embodiments shown in the drawings, which show FIG. 1 a first embodiment of the device in unimpaired operation, FIG. 2 this embodiment with soiling of the faceplate, FIG. 3 this embodiment with manipulation, FIG. 4 a second embodiment with control of the transmitting unit, FIG. 5 a third embodiment with control of the image recorder and FIG. 6 a modification of the third embodiment.

In FIGS. 1 to 6, a represents a side view, b a top view and c the image recorder image.

The device shown schematically in the drawing has a housing 10 in which a transmitting unit 12 and a receiving unit 14 are located. The housing 10 is closed off by a transparent, completely translucent faceplate 16.

The transmitting unit 12 in particular contains a light source 18, e.g. a laser diode, whose light is collimated by means of an optical collimator 20. The collimated light beam is fanned out by means of a diffractive optical element 22. By this means, light beams 24 that pass through the faceplate 16 are produced in a structured pattern. In the exemplary embodiment shown the structured illuminating pattern comprises light beams 24 that are fanned out over a plane. The light beams 24 strike an object 26 to be monitored that is illuminated by the beams 24 in this structured illumination pattern.

The receiving unit 14 contains an image recorder 28 on which the illuminating pattern of the object 26 is recorded by means of receiving optics 30. The receiving unit 14 is preferably a digital camera with a pixel matrix arrangement of photoelectric elements.

The transmitting unit 12 and the receiving unit 14 are disposed in the housing 10 offset with respect to one another such that a so-called triangulation configuration exists between the transmitting unit 12, the receiving unit 14 and the object 26. With this arrangement, light from the transmitting unit 12 that is directly reflected at the faceplate 16 or by the object 26 does not strike the receiving unit 14. The receiving unit 14 thus receives only the light of the illuminating pattern that is diffusely scattered by the object 26.

FIG. 1 shows the functioning of the device in trouble-free operation. The transmitting unit 12 emits fanned-out light beams 24. These light beams 24 pass unattenuated through the faceplate 16 and in part strike the object 26 to be monitored, which is illuminated with the characteristic illumination pattern of the structured light beams, e.g. with a line of illuminated points. The object light 32 that is diffusely scattered at these illuminated points passes through the faceplate 16 and is recorded by the image recorder 28 in the receiving unit 14. As FIG. 1c shows, three object image points 34 that display the illumination pattern of the object 26 are for example received by the image recorder 28. As long as these object-related image points 34 are present at the same location on the image recorder 28, the object 26 to be monitored is at the same location in the monitored space.

The receiving unit 14 records a field of vision onto the image recorder 28, the upper and lower viewing angle limits 26 of which are shown dashed in FIG. 1a. This viewing angle includes not only the space to be monitored in which the object 26 is located, but also the surface zone of the faceplate 16 at which the light beams 24 pass through the faceplate 16.

The light beams 24 strike the faceplate 16 in a plane that is essentially perpendicular to the faceplate 16. Due to the offset positioning of receiving unit 14 and the transmitting unit 12, the receiving plane of the receiving unit 14 is inclined in relation to this plane of the light beams 24, as FIG. 1a shows. The light of the light beams 24 that is reflected directly at the faceplate 16 therefore does not travel into the receiving unit 14.

If soiling accumulates on the faceplate 16, the intensity of the light beams 24 passing through the faceplate 16 is attenuated, which can lead to errors in the monitoring of the object 26. FIG. 2 shows the effects of such soiling 38.

If the light beams 24 strike soiling 38 deposited on the faceplate 16, the light of the light beams 24 is diffusely scattered by the soiling particles. This diffuse scattering produces bright illuminated points on the faceplate 16 that the receiving unit 14 records on the image recorder 28. Since the point of impact of the beams 24 on the faceplate 16 for receiving unit 14 lies at a different viewing angle than the object 26 to be monitored, the image points 40 due to soiling are offset on the image recorder 28 in relation to the object-related image points 34, as FIG. 1c shows. Corresponding to the fanned out light beams 24, a linear series of image points due to soiling 40 results that is displaced in parallel with respect to the linear series of object-related image points 34 according to the different viewing angle. The occurrence and the intensity of the image points 40 due to soiling provides an indication and a measure of the soiling of the faceplate 16.

A fault in the functioning of the monitoring can occur not only from soiling of the faceplate 16, but also as a result of a deliberate manipulation. This occurs when a cover 42 is placed in front of the device in order to interrupt the optical path between the device and the object to be monitored 26. FIG. 3 shows such a manipulation using a cover 42 that is placed in front of the faceplate 16.

In case of such a manipulation, the optical path of the light beams 24 to the object 26 is interrupted so that the object 26 is not illuminated and the image recorder 28 shows no object-related image points 34.

However, the light beams 24 strike the cover 42 and are diffusely scattered by it, so that the sites that the light beams 24 strike the cover 42 are recorded on the image recorder 28 as manipulation-related image points 44. If the cover 42 is placed directly on the faceplate 16, then the manipulation-related image points 44 correspond to the soiling-related image points 40. If the cover 42 is located at a distance from the faceplate 16, then the viewing angle changes, as does the divergence of the light beams 24 so that the line of manipulation-related image points 44 moves downward and the distance between the individual manipulation-related image points 44 increases. The appearance of image points 44 with simultaneous disappearance of object-related image points 34 is thus an indication of an attempt at manipulation.

Figure 4:
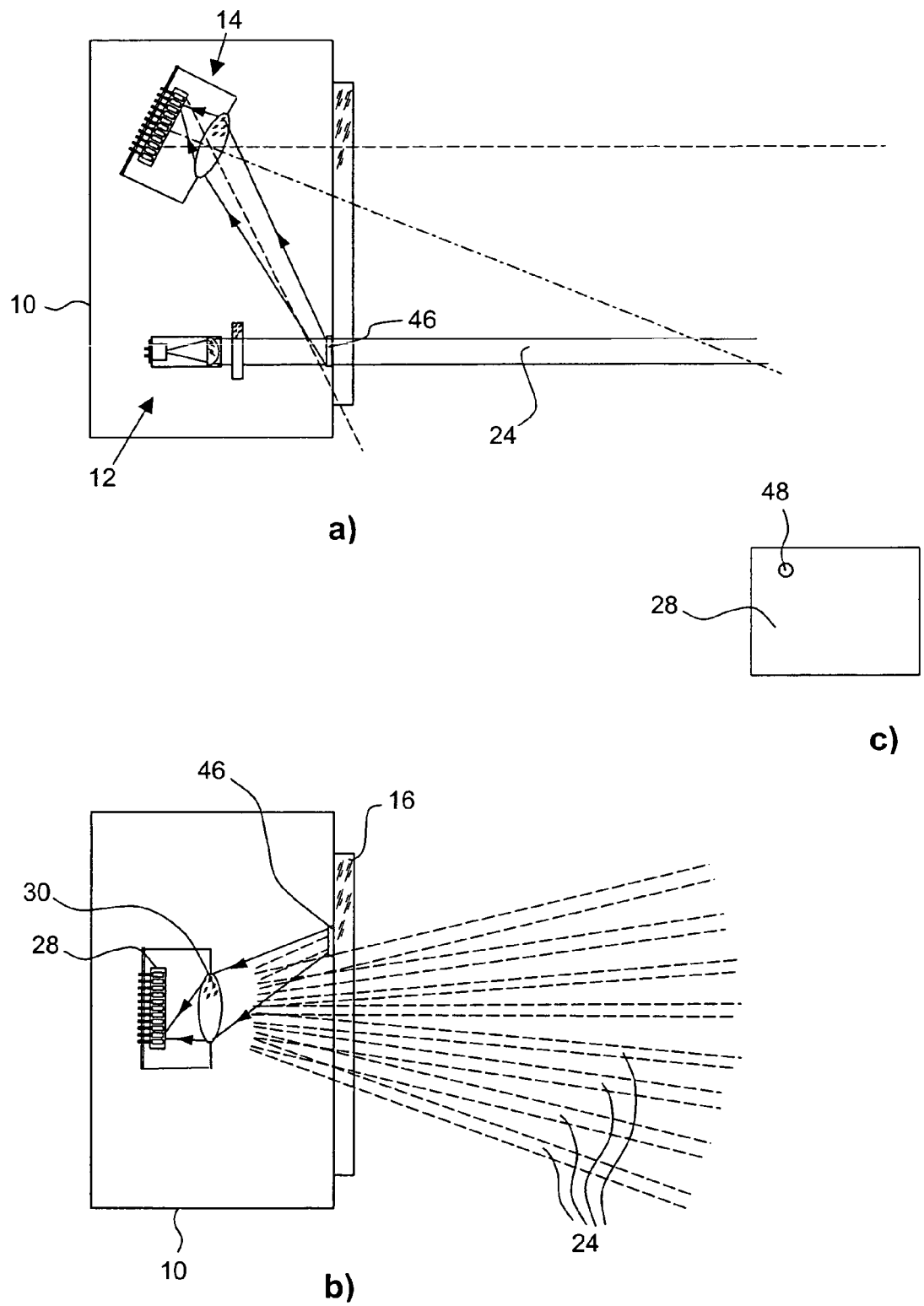

FIG. 4 shows a further embodiment of the device that enables continuous control of the functionality of the device.

For this purpose, the inherently completely translucent faceplate 16 is made to be diffusely scattering in a zone 46 struck by a light beam 24 that is not used for illuminating the object 26. The zone 46 can for example be superficially matted. This diffuse scattering area 46 thus corresponds to a defined constant point-like soiling spot on the faceplate 16. The zone 46 is accordingly recorded on the image recorder 28 as an image point 48 situated at a position located in the line of soiling-related image points 40.

Monitoring of the image point 48 from the diffusely scattering zone 46 makes it possible to check the functionality of the transmitting unit 12 and the receiving unit 14. As long as the image point 48 is present at a constant intensity and produces a constant signal in the receiving unit 14, the transmitting unit 12 and the receiving unit 14 are operating correctly. By means of the position of the image point 48 on the image recorder 28 it is also possible to determine whether the transmitting unit 12, the receiving unit 14 and the faceplate 16 are installed in the housing 10 in the correct mutual relationship. Lastly, by monitoring the image point 48, it is possible to make sure that the transmitting unit 12 is turned on so as to initiate the monitoring process.

To achieve further fault safety, in a further embodiment of the device it is also possible to check for the functioning of each individual pixel of the image recorder 28. As FIG. 5 shows, an additional wide angle emitting light source 50, e.g. a light emitting diode, is used for this purpose. The entire image recorder 28 is completely illuminated with this wide angle light source 50, as FIG. 5c shows. If each pixel or pixel group then produces a sufficient signal, this also shows the functionality of the image recorder 28 and of the receiving unit 14 in detail. Since it is of course not possible to perform any other image recording during this complete illumination, this check of the image recorder 28 can be only be performed as a test while the device is not in operation. Such monitoring can then naturally also take place automatically, at given time intervals.

Figure 5:
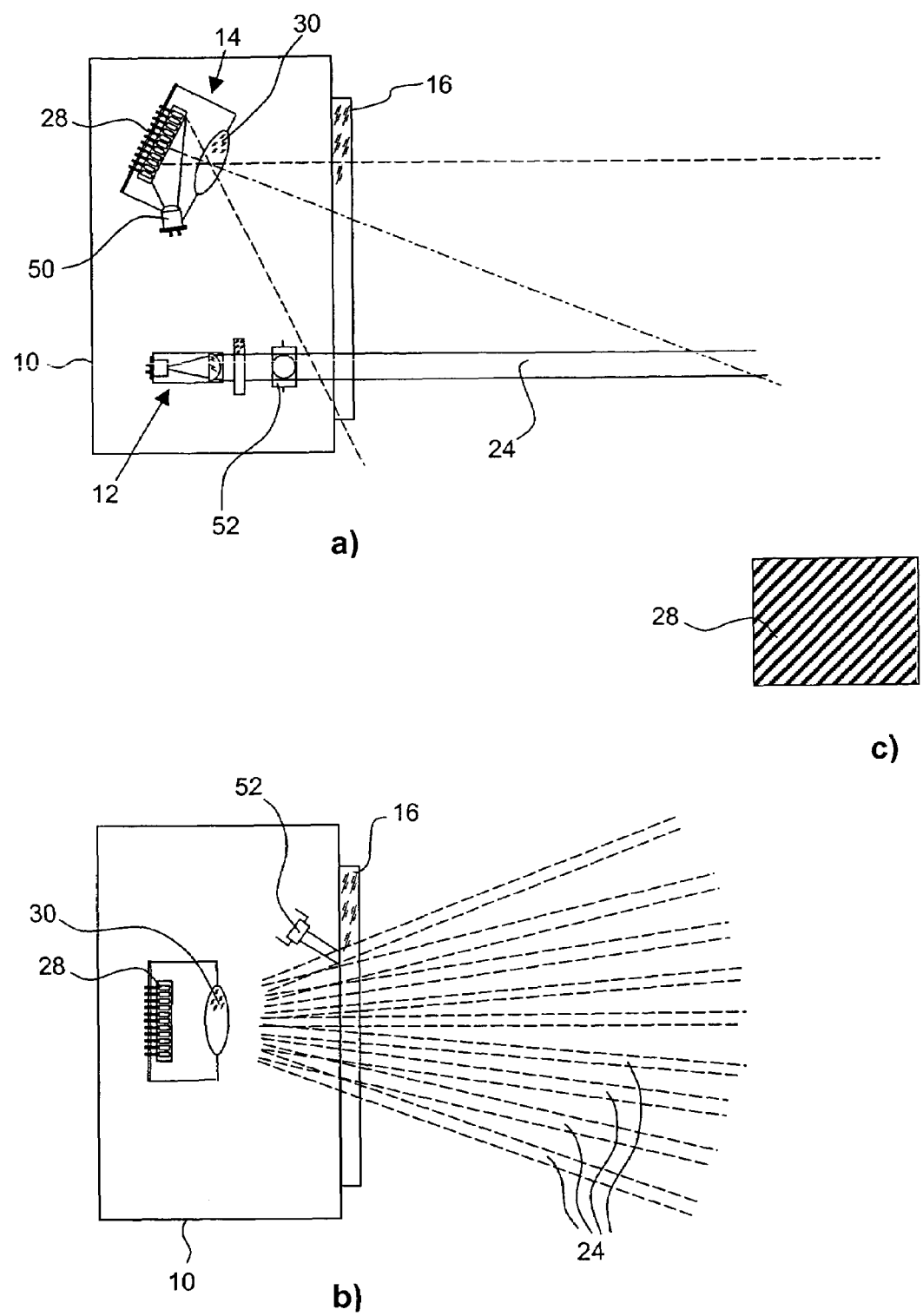
Figure 6:
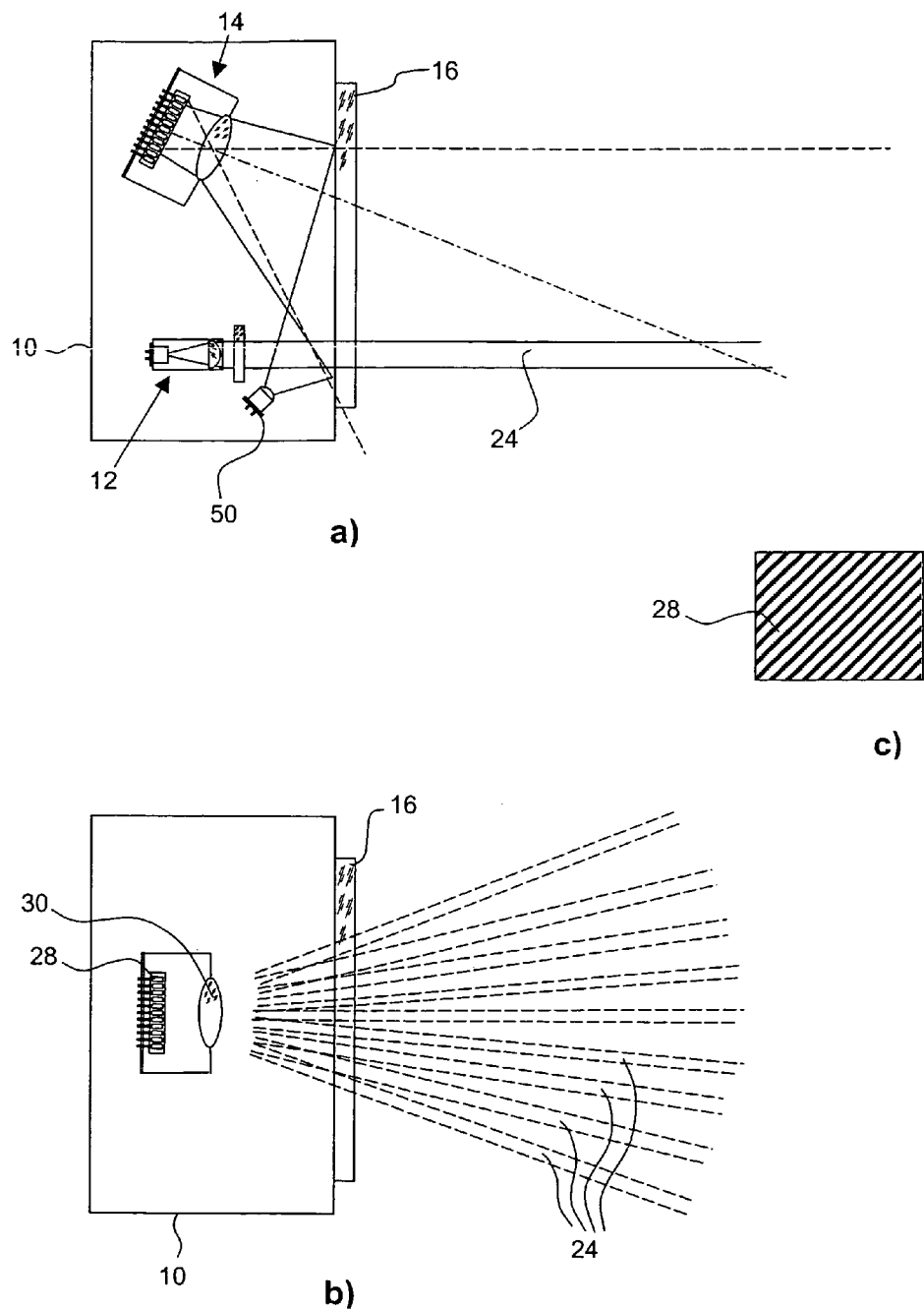

In the exemplary embodiment of FIG. 5 the wide angle light source 50 illuminates the image recorder 28 directly. In the embodiment of FIG. 6, the wide angle light source 50 illuminates the faceplate 16 so that the image recorder 28 is illuminated by the reflected light from the wide angle light source 50. The design shown in FIG. 6 may be advantageous due to placement and installation conditions in the housing 10.

In the designs of FIGS. 1 to 4, the image recorder 28 used for object monitoring with structured illumination is also used for recording and evaluating the soiling-related image points 40, the manipulation-related image points 44 and the function control-related image points 48. It is self-evident that monitoring for soiling, manipulation or functionality do not necessarily have to be performed by means of the same image recorder 28 with which the object-related image points 34 detected. An additional, separate receiving element can be used for this purpose. This receiving element then takes over the function of the zone of the image recorder 28 that evaluates the soiling-related image points 40, the manipulation-related image points 44, or the control-related image points 48.

If a separate receiving element is provided, then the latter can receive and evaluate the scattered light of the light beams 24, which is produced by diffuse scattering due to soiling on the faceplate 16 or by diffuse scattering by a manipulation-related cover 42. Similarly, it is possible for the separate receiving element to receive and evaluate the light scattered diffusely by soiling on the faceplate or by a cover coming from a separate light source. This is particularly possible if such a separate light source is a wide angle light source 50.

A separate receiving element can also be located and used in such a way that it captures directly reflected light from the transmitting unit, as shown in FIG. 5 for the receiving element 52. Directly reflected light beams 24 strike the receiving element 52. This provides for the possibility of double monitoring. If the light of a beam from the transmitting unit, this light being directly reflected at the faceplate 16, strikes the receiving element 52 with constant intensity, this means that the transmitting unit 12 is operating correctly and the faceplate 16 is not soiled and has not been manipulated. In the case of soiling of the faceplate 16 or manipulation, the receiving element 52 captures the diffusely scattered light in addition to the directly reflected light. The light intensity registered by the receiving element 52 therefore increases. If, on the other hand, malfunctions occur in the transmitting unit 12, its light intensity and thus the intensity of the light directly reflected into the receiving element 52 decreases. An increase in the signal of the receiving element 52 thus indicates soiling or manipulation, while a decrease in the signal captured by receiving element 52 indicates a malfunction of the transmitting unit 12.

REFERENCE SYMBOL LIST

10 Housing
12 Transmitting unit
14 Receiving unit
16 Faceplate
18 Light source
20 Beam collimation
22 Diffractive optical element
24 Light beams
26 Object
28 Image recorder
30 Receiving optics
32 Object-related light
34 Object image points
36 Viewing angle limits
38 Soiling
40 Soiling-related image points
42 Cover
44 Manipulation-related image points
46 Scattering zone
48 Image point associated with 46
50 Wide angle light source
52 Receiving element

The invention claimed is:

1. Device for optoelectronic monitoring of objects, with a transmitting unit (12) that transmits light beams (24) in a structured illuminating pattern, with a receiving unit (14), that contains an image recorder (28) on which the object (26) illuminated with structured illuminating pattern is recorded, and with a housing (10) in which the transmitting unit (12) and the receiving unit (14) are located and which has a faceplate (16) for the transmitting unit (12) and the receiving unit (14), characterized in that the transmitting unit (12), the receiving unit (14), and the faceplate (16) are positioned in the housing (10) so that the light beams that are directly reflected at the faceplate (16) do not travel into the image recorder (28) of the receiving unit (14) and so that beams from the transmitting unit (14) separately from the recording of the object (26) by means of receiving optics (30) included in the receiving unit (14), characterized in that the image recorder (28) contains a matrix arrangement of photoelectric elements and that light beams (24) diffusely scattered at the faceplate (16) are recorded by the image recorder (28) separate from recording of the object (26).

2. Device according to claim 1, characterized in that the transmitting unit (12) contains a light source (18), a beam collimator (20), and a diffractive optical element (22) for purposes of producing the light beams (24).

3. Device according to claim 1, characterized in that the light beams (24) are individual beams spread fan-like in a scanning plane and in that the receiving unit (14) observes the object (26) at a viewing angle that is inclined with respect to this scanning plane.

4. Device according to claim 1, characterized in that the faceplate (16) has a diffusely scattering zone (46) whose recording (48) on the image recorder (28) is used for monitoring functionality.

5. Device according to claim 1, characterized in that the receiving unit contains an additional receiving element (52) that is separate from the image recorder (28).

6. Device according to claim 1, characterized in that a wide angle light source (50) is provided that completely illuminates the image recorder (28) for purposes of checking functionality.

7. Device according to claim 5, characterized in that the receiving element receives beams from the transmitting unit (12) that are diffusely scattered at the faceplate (16).

8. Device according to claim 7, characterized in that the receiving element (52) receives beams from the transmitting unit (12) that are directly reflected at the faceplate (16).

* * * * *

UNITED STATES PATENT AND TRADEMARK OFFICE
CERTIFICATE OF CORRECTION

PATENT NO.        : 7,622,728 B2                                    Page 1 of 1
APPLICATION NO.   : 11/656498
DATED             : November 24, 2009
INVENTOR(S)       : Martin Wuestefeld It is certified that error appears in the above-identified patent and that said Letters Patent is hereby corrected as shown below:

Column 8, Claim 1, Line 8
Please delete "unit (14)"
and replace with -- unit (12) that are diffusely scattered at the faceplate (16) are detected in the receiving unit (14) --

Column 8, Claim 8, Line 39
Please delete "claim 7"
and replace with -- claim 5 --

Signed and Sealed this

Nineteenth Day of January, 2010

David J. Kappos
*Director of the United States Patent and Trademark Office*